United States Patent [19]

Monden

[11] Patent Number: 5,437,469
[45] Date of Patent: Aug. 1, 1995

[54] REINFORCED FOLDABLE AIRBAG LID

[75] Inventor: Katsunori Monden, Hiroshima, Japan

[73] Assignee: Mazda Motor Corporation, Hiroshima, Japan

[21] Appl. No.: 215,781

[22] Filed: Mar. 22, 1994

[30] Foreign Application Priority Data

Mar. 25, 1993 [JP] Japan .................................. 5-066362

[51] Int. Cl.6 .............................................. B60R 21/20
[52] U.S. Cl. .................... 280/728.3; 280/732
[58] Field of Search ............... 280/728 B, 728 A, 732, 280/752, 728 R

[56] References Cited

U.S. PATENT DOCUMENTS

| 3,794,349 | 2/1974 | Fuller | 280/732 |
| 5,195,776 | 3/1993 | Sakakida et al. | 280/732 |
| 5,238,264 | 8/1993 | Barnes | 280/732 |

FOREIGN PATENT DOCUMENTS

| 4-59450 | 2/1992 | Japan . | |
| 4-89449 | 8/1992 | Japan . | |
| 4310450 | 11/1992 | Japan | 280/728 B |
| 5000646 | 1/1993 | Japan | 280/728 A |
| 5024495 | 2/1993 | Japan | 280/728 B |
| 5147488 | 6/1993 | Japan | 280/732 |

Primary Examiner—Margaret A. Focarino
Assistant Examiner—Peter C. English
Attorney, Agent, or Firm—Keck, Mahin & Cate

[57] ABSTRACT

An automobile airbag system has an airbag which inflates and expands toward a passenger seat through an opening formed in an instrument panel disposed below a front windshield glass so as to restrain and protect a passenger upon an occurrence of a collision. An airbag lid which is disposed in the instrument panel opening with its upper side hinged to the instrument panel. The airbag lid is flipped upward by the airbag during the inflation and expansion of the airbag. The airbag lid is formed with a weakened portion by which it easily bends and is folded in two when it hits the front windshield glass. The lid is also provided with a reinforcing structure in close proximity to the weakened portion which provides the airbag lid with an increased rigidity.

12 Claims, 5 Drawing Sheets

REINFORCED FOLDABLE AIRBAG LID

BACKGROUND OF THE INVENTION

1. Field of the Invention

The present invention relates to an automobile airbag system and, in particular, to the structure of a lid for an airbag system.

2. Description of Related Art

Typically, passenger side supplemental restraint systems, which are generally called airbag systems, have the main body of an airbag system located inside an instrument panel and an airbag lid provided on the front of the airbag system main body, i.e. on the side of an opening of the airbag system main body through which an airbag inflates and expands. This airbag lid is located in an opening formed in part of the instrument panel extending below a front windshield glass and is hinged at its top to the instrument panel so that, when the airbag inflates and expands, the airbag lid is flipped upward about the hinged top by the inflating and expanding airbag. Such an airbag system is known from, for instance, Japanese Unexamined Patent Publication No. 4-59450.

On the other hand, in order for the airbag lid to break easily so as to relieve the energy of an impact when the airbag lid is flipped up and smashes against the front windshield glass, the airbag lid is made easy to break. Such a flip-up airbag lid is known from, for instance, Japanese Unexamined Utility Model Publication No. 4-89449.

In recent years, it is demanded or required by rule or regulation that instrument panels must be structured so that they do not make an impact larger than a specific force or strength on a passenger's head. In other words, the instrument panel, when hit or struck by the passenger's head, does not cause the passenger's head to be subjected to or experience negative acceleration greater than a specific level. For the fulfillment of or compliance with this rule or regulation, the flip-up airbag lid is structured such that it has an increased rigidity so as to absorb the energy of an impact gradually during its deformation due to being struck a blow by a passenger's head. Accordingly, the flip-up airbag lid is required to meet two somewhat conflicting requirements that govern structural rigidity and easy breakage.

SUMMARY OF THE INVENTION

It is an object of the present invention to provide an automobile airbag system having an airbag lid which is sufficiently rigid and yet is easily breakable.

This object is accomplished by providing an automobile airbag system in which an airbag inflates and expands toward a passenger seat through an opening formed in an instrument panel disposed below a front windshield glass so as to restrain and protect a passenger upon an occurrence of a collision. During the inflation and expansion of the airbag, an airbag lid, disposed in the instrument opening with its upper side hinged to the instrument panel, is flipped upward by the airbag. The airbag lid is provided with a weakening means, such as an elongated slot or slots, by which means the lid easily bends and is folded in two when it hits the front windshield glass. Further, there is provided a reinforcing means comprising, for instance, ribs, located in close proximity to the weakening means, to provide the airbag lid with an increased rigidity.

The airbag lid may be provided with another reinforcing means, in addition to or in place of the above mentioned reinforcement means, such as brackets, also serving as positioning means, for providing the airbag lid with an increased rigidity. This additional reinforcing means is disposed on transversely opposite sides of transverse weakening means and secured to the airbag lid on vertically opposite sides of the transverse weakening means so as to extend in a direction spatially intersecting the transverse weakening means. The additional reinforcing means is formed with a weakened portion by means of which the reinforcing means is allowed to easily bend following bending of the airbag lid. The bracket is provided with flanges projecting toward the airbag lid and is formed with a dent near one end which serves as a weakening means.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

It is to be noted that the term "front" or "front side" as used herein shall mean and refer to the side toward the front of a vehicle in the longitudinal direction and the term "rear" or "rear side" as used herein shall mean and refer to the side toward the back of the vehicle in the longitudinal direction.

Figure 1:
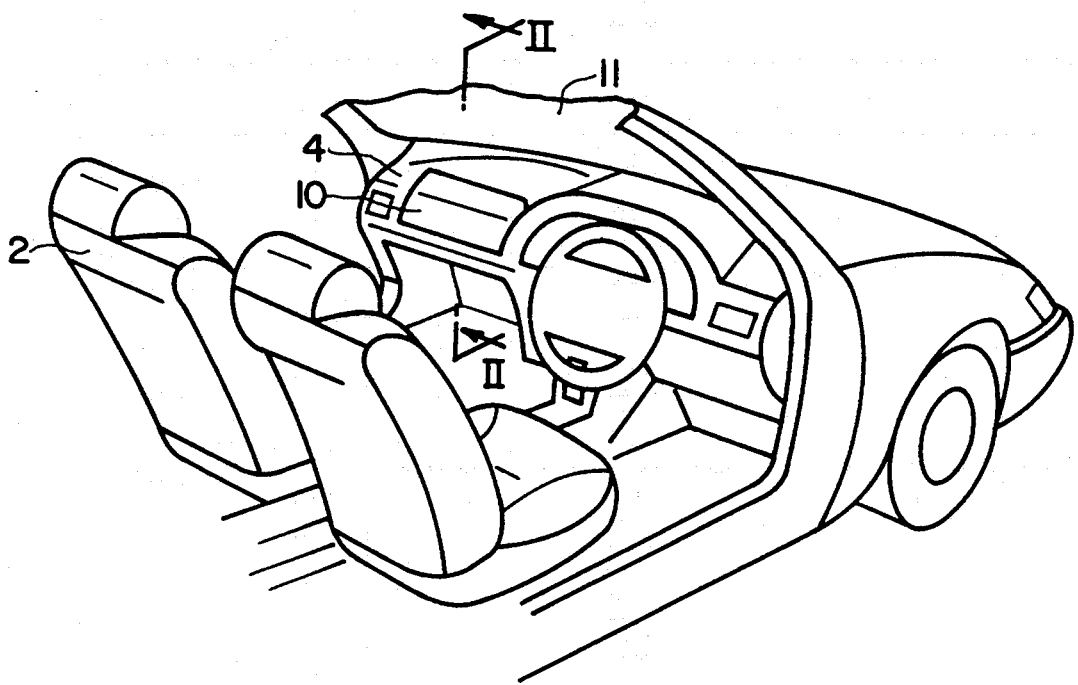
FIG. 1 is a schematic illustration showing the front section of a vehicle which is equipped with an air bag system in accordance with a preferred embodiment of the present invention.
Figure 2:
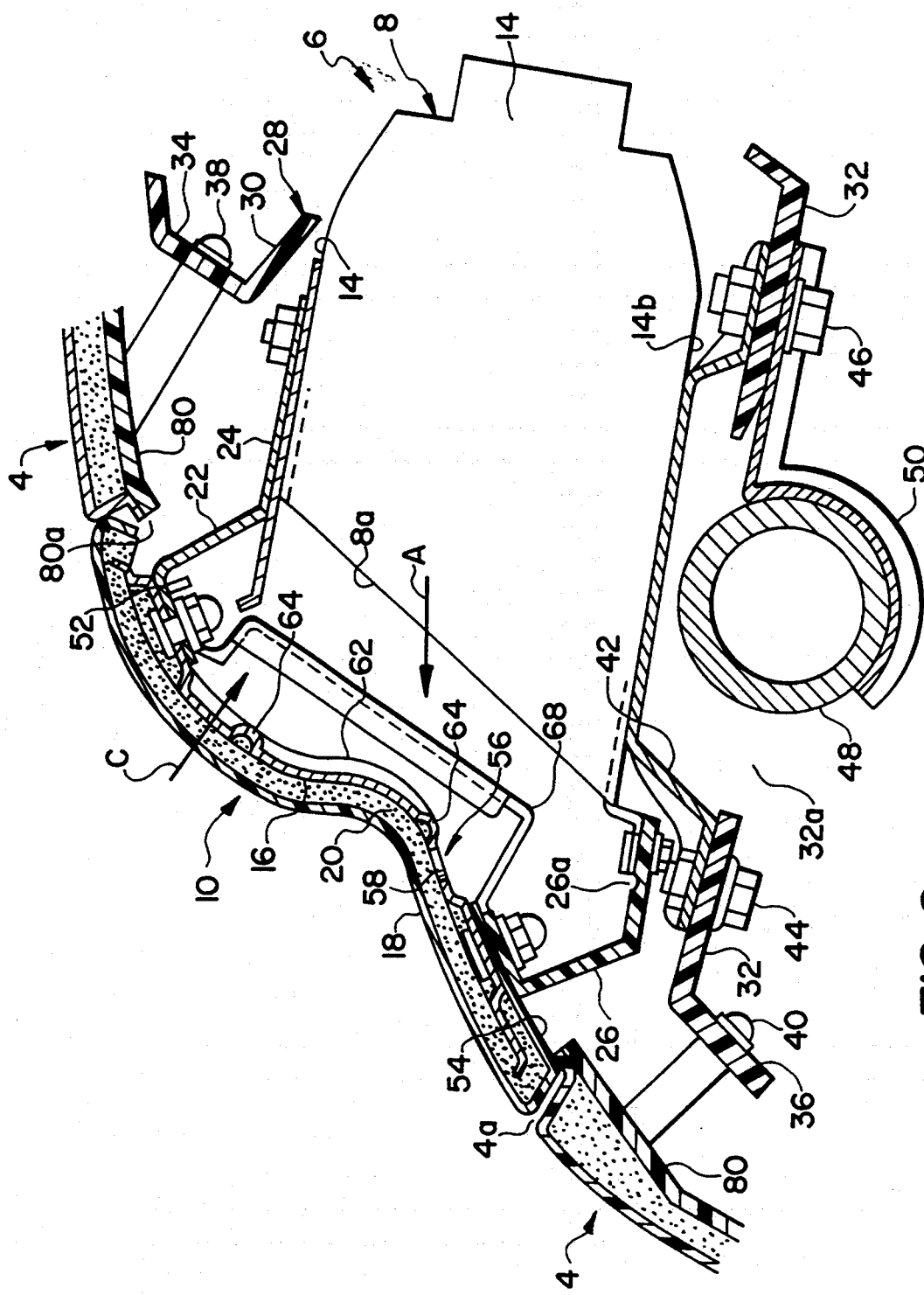
FIG. 2 is a cross-sectional view of FIG. 1 taken along line II—II (see also FIG. 3)
Figure 3:
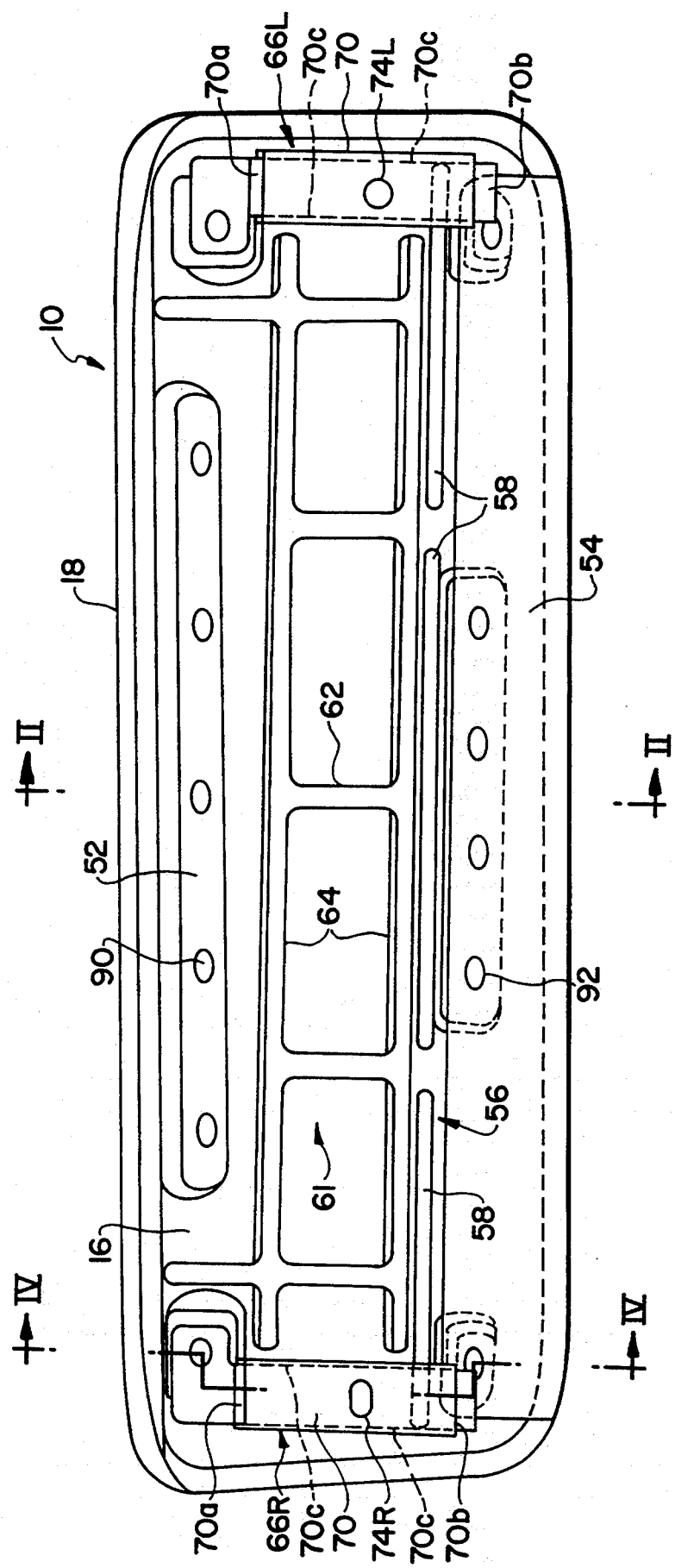
FIG. 3 is a view of an airbag lid as viewed in a direction indicated by arrow A in FIG. 2.

Referring to the drawings in detail and, in particular, to FIGS. 1 to 3, a passenger-side airbag system 6 in accordance with a preferred embodiment of the present invention is installed, as a supplemental restraint system, inside, i.e. on the front side, of an instrument panel 4 where a passenger seat 2 faces. This airbag system 6 is composed of an airbag main unit 8 and an airbag lid 10 that is located on the rear side of the airbag main unit 8. The airbag main unit 8 is formed with a rear opening 8a facing toward the instrument panel 4. The airbag lid 10 is installed in an opening 4a formed in the instrument panel 4 so as to form a part of the instrument panel 4 which is positioned below a front windshield glass 11. The airbag main unit 8 has a generally box-shaped airbag unit housing 14 having the rear opening 8a and is equipped with an airbag (not shown), an inflator and an ignition system all of which are built in the airbag unit housing 14. These airbag, inflator and ignition systems may be any type well known to those skilled in the art.

The airbag lid 10 is composed of a base plate 16 made of a metal plate, such as steel, a synthetic resin surface cover 18 that covers the rear surface of the base plate 16, and a foam member 20, such as polyurethane foam or the like, filled in a space between the base plate 16 and the surface cover 18. The base plate 16 is bolted, or otherwise secured, at its top end to one end of a metal plate 24 that is adapted or bent to crook so as to work as a hinge 22. The metal plate 24 is attached at its other end to the top wall 14a of the airbag unit housing 14. The base plate 16 is attached at its lower end to one end of a connecting member 26 which is made of synthetic resin and has a transversely extending groove or notch 26a so as to be broken easily. The other end of this connecting member 26 is attached to the bottom wall 14b of the airbag unit housing 14. The base plate 16 is formed with holes 90 and 92 for bolts by means of which the hinge portion 22 of the metal plate 24 and the connecting member 26 are secured to the base plate 16. The airbag lid 10 thus formed is attached to the airbag unit housing 14 by means of the hinge portion 22 of the metal plate 24 and the connecting member 26.

The instrument panel 4 is provided with an airbag fitting 28, secured from the rear to a part where the opening 4a is formed, which has a frame configuration structured by a top plate 30, a bottom plate 32 formed with an opening 32a, and left and right side plates (not shown). These top and bottom plates 30 and 32 are formed with flanges 34 and 36, respectively, and are attached to the instrument panel 4 by bolts 38 and 40 through the flanges 34 and 36. Furthermore, the airbag main unit 8 is welded, or otherwise secured, to fitting legs 42. The fitting legs 42 are secured to the bottom plate by means of bolts 44 and 46 inserted into holes of the bottom plate 32 of the airbag fitting 28, thereby fitting the airbag main unit 8 to the airbag fitting 28.

Inside, i.e. on the front side of, the instrument panel 4, there is installed a pipe-shaped support member 48 transversely extending with its opposite ends being connected to the left and right sidewalls (not shown) of the vehicle. The support pipe 48 is provided with a support bracket 50 welded, or otherwise secured, thereto. The support bracket 50 is formed with bolt holes, through which bolts 46 are inserted, and extends so as to secure the fitting legs 42, the airbag fitting 28 and the support bracket 50 all together. Thus, the airbag main unit 8 and the airbag fitting 28 are supported strongly by the support pipe 48.

For the installation of the airbag system 6, the support bracket 50 is welded, or otherwise secured, to the support pipe 48 first. Then, the airbag main unit 8, to which the airbag lid 10 has been previously attached, is installed inside the instrument panel 4 through the opening 4a and placed so as to align the bolt holes of the lower plate 32 of the airbag fitting 28 with the bolt holes of the fitting legs 42. Bolts 44 are then passed through both these bolt holes at the front portion of the fitting leg 42, while at the rear portion of the fitting leg 42, bolts 46 are passed through both these bolt holes, and bolt holes of the support bracket 50 so as to couple the airbag main unit 8 and the airbag fitting 28 together.

The airbag system 6 includes an acceleration sensor (not shown) for detecting rapid deceleration of the vehicle due to a frontal collision and provides a collision signal which causes the ignition system to operate so as to supply gas into the airbag from the inflator, thereby inflating and expanding the airbag through the opening 8a. During the expansion, the airbag breaks the connecting member 26 along the transverse notch 26a, and subsequently, flips the airbag lid upward along the hinge 22 provided at the top of the airbag lid 10. As a result, the airbag is enabled to expand toward the passenger so as to restrain and protect the passenger.

Describing the structure of the airbag lid 10 in more detail, this airbag lid 10 is provided with brittle strip portion 56 as a weakening means, extending transversely between its upper half portion 52 to which the hinge 22 is secured and its lower half portion 54, which is adapted to break easily. This weakened or brittle strip portion 56 is formed by a plurality of elongated slits 58 formed in the base plate 16 and extending in a straight line along nearly the whole width of base plate 16 so as to enable the airbag lid 10 to bend or break easily along the brittle strip portion 56 when a large impact is applied to the airbag lid 10 from the front. In addition, the airbag lid 10 is equipped with a reinforcement structure 61 (see FIG. 3) for being enhanced in rigidity which includes vertical ribs 62 extending in the direction of the height of the airbag lid 10 and horizontal ribs 64 extending in the direction of the width of the airbag lid 10 on both sides of the vertical ribs 62 so as to form a grid-like rib structure. All of these ribs 62 and 64 are formed integrally with the base plate 16 of the airbag lid 10. Each of the vertical ribs 62 terminates in close proximity to and above the elongated slits 58 so that it does not pass over the elongated slits 58 in the vertical direction and impair the easiness of bending or breakage of the brittle strip portion 56. The weakened strip portion 56 is positioned in close proximity to a lower portion of the airbag lid 10 and, more specifically, is positioned below and adjacent to the lower end of the grid-like rib structure of the reinforcement structure 61.

In addition to the reinforcement structure 61, the airbag lid 10 is provided with a positioning means, serving also as a reinforcement means for providing the airbag lid 10 with an increased rigidity, which includes positioning frames or brackets 66R and 66L secured to the base plate 16 from the front side. These positioning brackets 66R and 66L are used to correctly position the airbag lid 10 in the opening 4a of the instrument panel 4.

Figure 4:
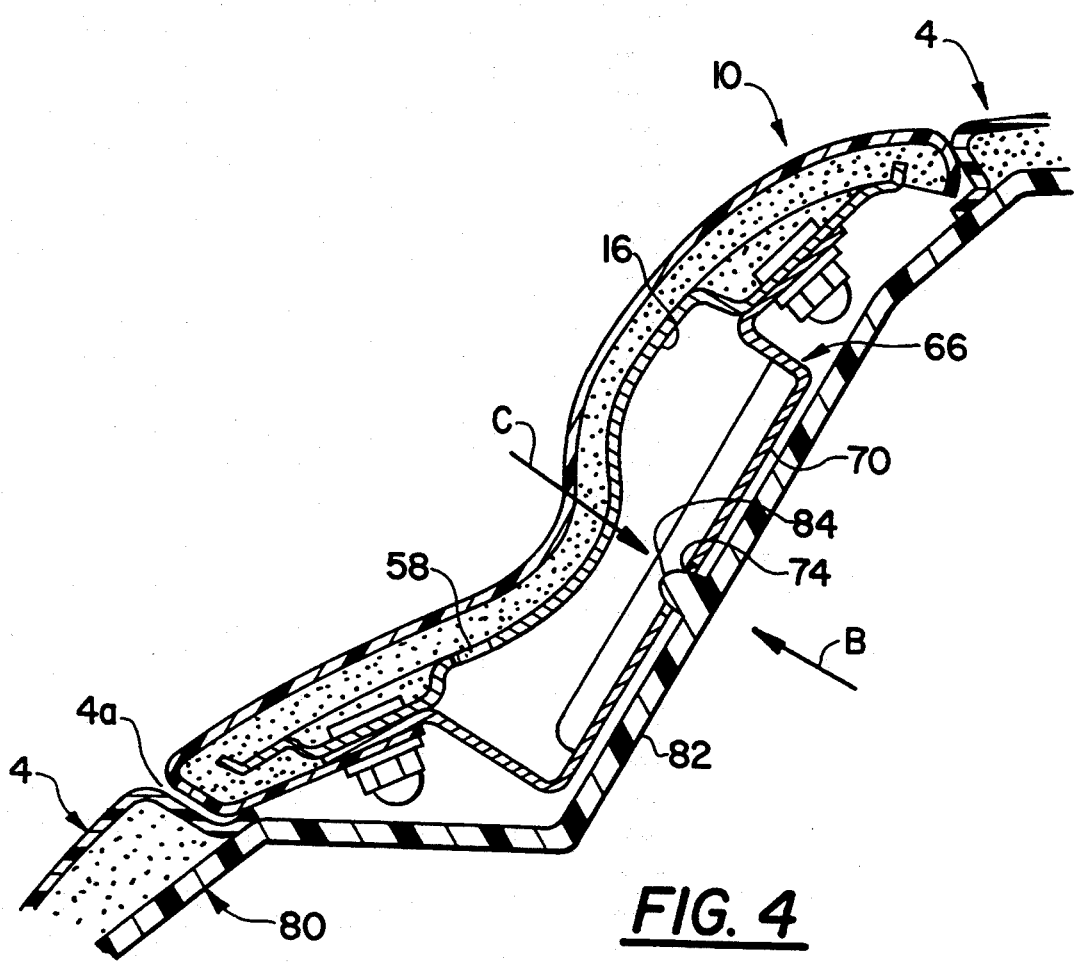
FIG. 4 is a cross-sectional view of FIG. 3 taken along line IV—IV.
Figure 5:
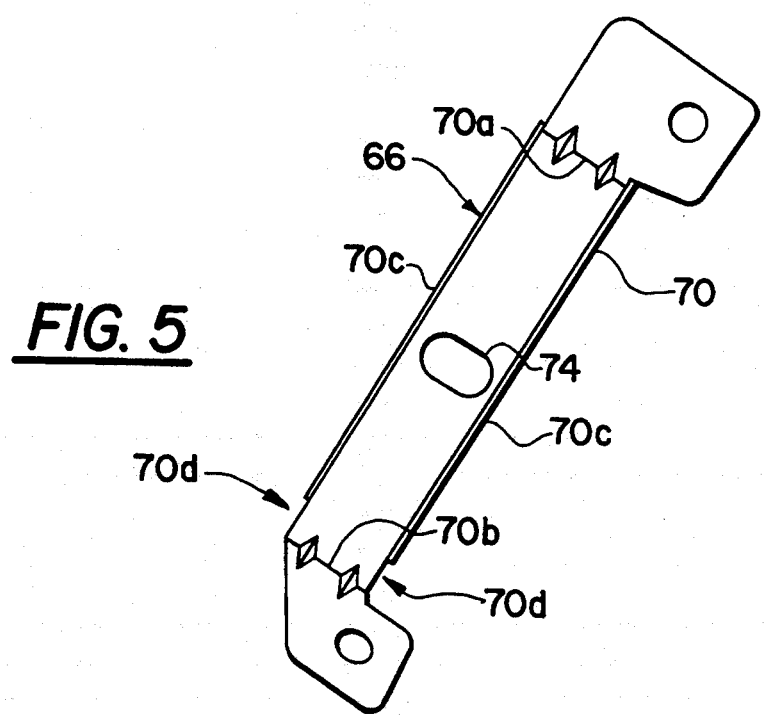
FIG. 5 is a view of a positioning bracket as viewed in a direction indicated by an arrow B in FIG. 4.

Referring to FIGS. 4 and 5, the positioning brackets 66R and 66L are secured to left and right transverse ends of the base plate 16. The positioning bracket 66R, 66L has a base portion 70, an upper end arm portion 70a and a lower end arm portion 70b. Both upper and lower end arm portions 70a and 70b extend rearward toward the airbag lid 10 perpendicularly from the base portion 70 so as to form a generally U-shaped structure (see FIGS. 2 and 4) and are bolted, or otherwise secured, to the base plate 16 of the airbag lid 10 so that the base portion 70 is placed to spatially intersect the weakened strip portion 56 of the airbag lid 10.

One of the positioning brackets 66R and 66L, for instance the left positioning bracket 66L, has a circular hole 74L formed in the base portion 70 thereof, while the other, i.e. the right positioning bracket 66R, has an oval hole or slot 74R wider in the transverse direction than in the lengthwise direction formed in the base portion 70 thereof.

Figure 6:
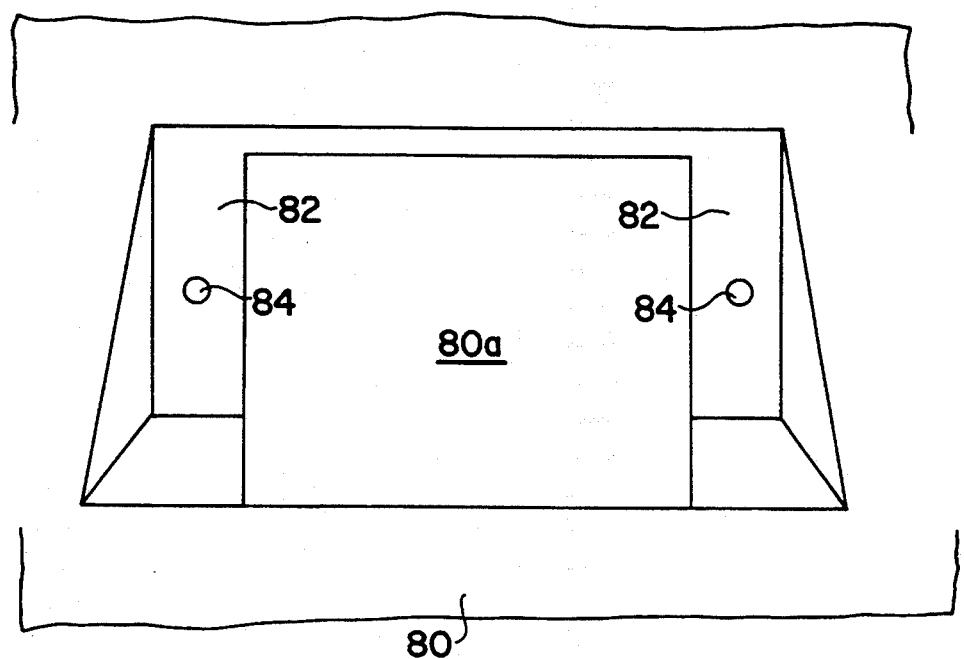
FIG. 6 is a view of an instrument panel core as viewed in a direction indicated by arrow C in FIGS. 2 and 4.

Referring to FIG. 6, showing a core panel portion 80 of the instrument panel 4 formed with an opening 80a as viewed in the direction of arrow C in FIGS. 2 and 4, the core panel portion 80 is formed with flanges 82 on transverse sides of the opening 80a. Each of the flanges 82 is provided with a projection or pin 84. The left and right positioning brackets 66L and 66R are placed so as to coincide with the left and right flanges 82, respectively, and then to fit or receive the projections 84 into the circular hole 74L and the oval hole or slot 74R thereof, respectively, thereby placing the airbag lid 10 in position with respect to the opening 4a of the instrument panel 4. In this instance, in particular, fitting of the left projection 84 into the circular hole 74L provides the vertical and horizontal positioning of the left side end of the airbag lid 10, and fitting of the right projection 84 into the oval hole 74R provides the vertical positioning of the right side end of the airbag lid 10. By means of this positioning, the accurate positioning of the airbag lid 10 is accomplished without inclining in horizontal position.

The positioning brackets 66L and 66R also serve as a reinforcement means for the airbag lid 10 and consequently, are essentially rigid sufficiently so as to exhibit the function of reinforcement. For this reason, the positioning bracket 66L, 66R has side flanges 70c extending along on both sides of the base portion 70. These side flanges 70c are connected at their upper ends to the upper end arm portion 70a and are separated or terminated at their lower ends spaced from the lower end arm portion 70b so as to provide cut-out portions or notches 70d as weakening or brittle means, in the lower corner 86, thereby enabling the positioning bracket 66L, 66R to bend or break at the lower corner 86 following bending or breaking of the airbag lid 10 along the weakened strip portion 56. Because of the cut-out portions 70d of the flanges 70c near the lower corners 86 and because the positioning brackets 66L and 66R bend or break by nature at the lower corners 86, the positioning brackets 66L and 66R can quite easily bend or break at the lower corners 86 where the flanges 70c are cut out. On the other hand, the positioning brackets 66L and 66R are reinforced in structural rigidity by the flanges 70c so as to suppress their deformation, thereby providing an increased accuracy of positioning of the airbag lid 10.

As described in detail, because the airbag lid 10 of the airbag system 6 is provided with the reinforcement structure 61 integrally formed with and increasing the rigidity of the base plate 16, it absorbs the energy of an impact gradually during its deformation due to being struck a blow by a passenger's head upon an occurrence of a frontal collision, so as to provide a decrease in impact against the passenger's head.

In addition, because of the provision of the weakened strip portion 56 in the base plate between the upper half portion 52 to which the hinge 22 is secured and its lower half portion 54, the airbag lid 10 easily bends at this weakened strip portion 56 under reaction force applied against the lower half portion 54 from the front windshield glass 11 if it is flipped up and strikes the front window glass 11 during inflation and expansion of the airbag, thereby absorbing the energy of an impact of the airbag lid 10 striking the front windshield glass 11. Furthermore, because of the provision of the weakened strip portion 56 in close proximity to the reinforcement structure 61, the reinforcement structure 61 promotes stress concentration on the weakened strip portion 56 when the airbag lid 10 strikes the front window glass 11 during inflation and expansion of the airbag.

Figure 7:
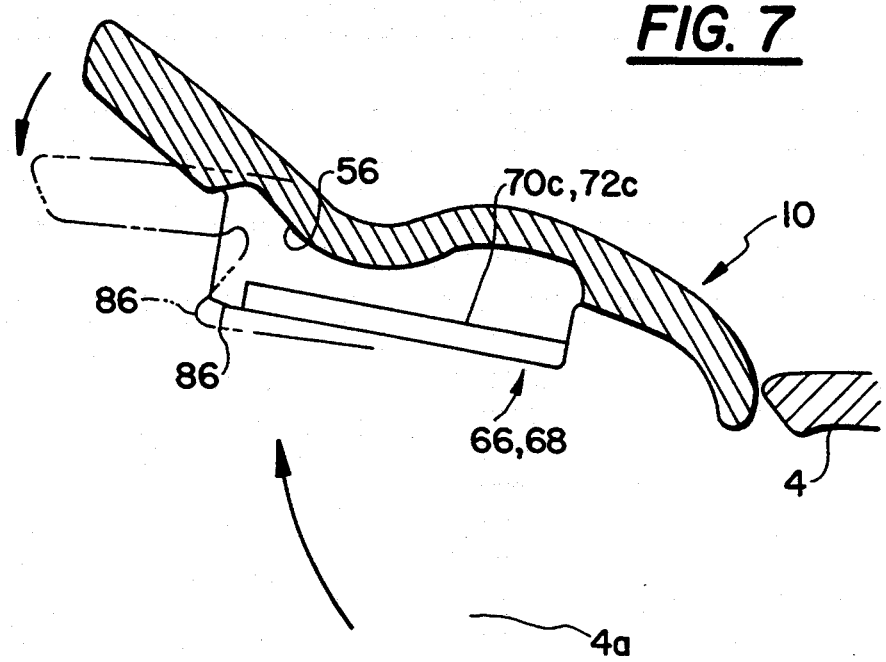
FIG. 7 is an illustration showing deformation of a reinforcement means.

In addition, because the airbag lid 10 is provided with the positioning brackets 66R and 66L which extend spatially intersecting the weakened strip portion 56 and are secured to the airbag lid 10 on opposite sides of the weakened strip portion 56, the airbag lid 10 is increased in structural rigidity, so that it absorbs the energy of an impact gradually during its deformation due to being struck a blow by a passenger's head upon a occurrence of a frontal collision, thereby decreasing an impact against the passenger's head. Furthermore, because the positioning brackets 66L and 66R are formed with the cut-out portions or notches 70d in the lower corner 86 so as to bend or break easily at the lower corner 86 following bending or breaking of the airbag lid 10 along the weakened strip portion 56 as shown by double-dotted line in FIG. 7, they enable the airbag lid 10 to easily bend or break without retardation.

It is to be understood that it is not always essential to make the positioning brackets 66L and 66R serve as reinforcement members and that the reinforcement structure 61 and the weakened strip portion 56 may be integrally provided not with the base plate 16 but with the airbag lid 10. Furthermore, the reinforcement structure 61 and the weakened strip portion 56 may be of any type of structure.

It is also to be understood that although the present invention has been described in detail with respect to a preferred embodiment, various other embodiments and variants may occur to those skilled in the art, which fall within the scope and spirit of the invention. Such other embodiments and variants are intended to be covered by the following claims.

What is claimed is:

1. In an automobile including an airbag system having an airbag which inflates and expands toward a passenger seat through an opening formed in an instrument panel disposed below a front windshield glass so as to restrain and protect a passenger upon an occurrence of a collision, and an airbag lid, disposed in said opening and hinged at an upper portion thereof to a housing for said airbag so as to be flipped upward by said airbag as said airbag inflates and expands, the improvement comprising:

a base plate included in said airbag lid;

weakened means, defined by said base plate, for causing said airbag lid to bend and be folded in two when said airbag lid hits the front windshield glass due to an impact; and reinforcing means, mounted on said airbag lid in close proximity to said weakened means, for reinforcing said airbag lid and providing said airbag lid with an increased rigidity;

wherein said weakened means comprises a transverse brittle strip portion formed between upper and lower half portions of said base plate, said transverse brittle strip portion being more brittle than a major portion of said airbag lid, said transverse brittle strip portion includes an elongated slit formed in said base plate, and said reinforcing means further comprises a plurality of brackets disposed transversely at opposite ends of said transverse brittle strip portion and each being secured to said base plate on vertically opposite sides of said transverse brittle strip portion so as to extend in a direction spatially intersecting said transverse brittle strip portion, at least one of said brackets being formed with a transverse brittle portion by means of which said at least one of said brackets easily bends following bending of said airbag lid.

2. In an automobile as defined in claim 1, wherein each of said brackets is formed with side flanges, each of said side flanges being terminated in close proximity to but spaced from one end of one of said brackets to allow said one of said brackets to easily bend at said one end.

3. In an automobile as defined in claim 2, wherein each of said brackets comprises a base portion and upper and lower arm portions which together form a generally U-shape, said base portion being integrally formed with said side flanges, each of said side flanges initiating from one of said upper and lower arm portions and terminating in close proximity to the other of said upper and lower arm portions.

4. In an automobile as defined in claim 3, wherein said brackets serve as positioning means for positioning said airbag lid in said opening with respect to said instrument panel.

5. In an automobile as defined in claim 1, wherein said reinforcing means comprises a plurality of ribs.

6. In an automobile as defined in claim 5, wherein said ribs are formed integrally with said base plate.

7. In an automobile as defined in claim 6, wherein said ribs are arranged in a grid-like pattern.

8. An automobile airbag system having an airbag, which inflates and expands toward a passenger seat through an opening formed in an instrument panel disposed below a front windshield glass so as to restrain and protect a passenger upon an occurrence of a collision, and an airbag lid, disposed in said opening and hinged at an upper portion thereof to a housing for said airbag so as to be flipped upward by said airbag as said airbag inflates and expands, said airbag lid comprising:

weakened means, transversely extending in said airbag lid, for causing said airbag lid to bend and be folded in two when said airbag lid hits the front windshield glass due to an impact; and reinforcing means for reinforcing said airbag lid and providing said airbag lid with an increased rigidity, said reinforcing means being disposed at transversely opposite ends of said weakened means and secured to said airbag lid on vertically opposite sides of said weakened means so as to extend in a direction spatially intersecting said weakened means, said reinforcing means being formed with a weakened portion by which said reinforcing means is easily bent following bending of said airbag lid.

9. An automobile airbag system as defined in claim 8, wherein said reinforcing means comprises brackets disposed at transversely opposite ends of said weakened means and secured to said airbag lid on vertically opposite sides of said weakened means so as to extend in a direction spatially intersecting said weakened means, each of said brackets being formed with said weakened portion by which each of said brackets easily bends following bending of said airbag lid.

10. An airbag system as defined in claim 9, wherein each of the brackets is formed with side flanges, each of said side flanges being terminated in close proximity to one end of one of said brackets so as to cause said one of said brackets to easily bend at said one end.

11. An airbag system as defined in claim 10, wherein each of said brackets comprises a base portion and upper and lower arm portions which together form a generally U-shape, said base portion being integrally formed with said side flanges, each of said side flanges initiating from one of said upper and lower arm portions and terminating in close proximity to the other of said upper and lower arm portions.

12. An airbag system as defined in claim 11, wherein said brackets serve as positioning means for positioning said airbag lid in said opening with respect to said instrument panel.

* * * * *